US006591355B2

(12) United States Patent
Schuster et al.

(10) Patent No.: US 6,591,355 B2
(45) Date of Patent: Jul. 8, 2003

(54) DISTRIBUTED SHARED MEMORY SYSTEM WITH VARIABLE GRANULARITY

(75) Inventors: Assaf Schuster, Haifa (IL); Ayal Itzkovitz, Haifa (IL)

(73) Assignee: Technion Research and Development Foundation Ltd., Haifa (IL)

( * ) Notice: Subject to any disclaimer, the term of this patent is extended or adjusted under 35 U.S.C. 154(b) by 314 days.

(21) Appl. No.: 09/788,024

(22) Filed: Feb. 16, 2001

(65) Prior Publication Data

US 2002/0013889 A1 Jan. 31, 2002

Related U.S. Application Data

(63) Continuation-in-part of application No. 09/161,810, filed on Sep. 28, 1998, now Pat. No. 6,263,414.
(60) Provisional application No. 60/183,313, filed on Feb. 17, 2000.

(51) Int. Cl.⁷ .......................... G06F 12/08; G06F 13/00
(52) U.S. Cl. ................... 711/202; 711/203; 711/147; 709/213
(58) Field of Search ..................... 709/213; 711/100, 711/147, 150, 200, 202, 203

(56) References Cited

U.S. PATENT DOCUMENTS

| 5,428,803 | A | | 6/1995 | Chen et al. | |
|---|---|---|---|---|---|
| 5,522,045 | A | | 5/1996 | Sandberg | |
| 5,592,625 | A | | 1/1997 | Sandberg | |
| 5,617,537 | A | * | 4/1997 | Yamada et al. | 709/214 |
| 5,625,831 | A | | 4/1997 | Priest et al. | |
| 5,974,536 | A | | 10/1999 | Richardson | |
| 6,049,853 | A | | 4/2000 | Kingsbury et al. | |
| 6,055,605 | A | | 4/2000 | Sharma et al. | |
| 6,055,617 | A | | 4/2000 | Kingsbury | |
| 6,085,263 | A | | 7/2000 | Sharma et al. | |
| 6,363,458 | B1 | * | 3/2002 | Park | 711/141 |

FOREIGN PATENT DOCUMENTS

EP          0 817 060          1/1998

OTHER PUBLICATIONS

US 6,021,479, 2/2000, Stevens (withdrawn)
Carter, J., "Design of the Munin Distributed Shared Memory System", *Journal of Parallel and Distributed Computing*, vol. 29, No. 2, pp. 219–227, Sep. 1995, Florida.
Kadiyala, M. et al., "A Dynamic Cache Sub–block Design to Reduce False Sharing", *International Conference on Computer Design: VLSI in Computers and Processors*, Austin, Tex., Oct. 1995, pp. 313–318.
Jou, et al., "Two–Tier Paging and Its Performance Analysis for Network–based Distributed Shared Memory Systems", 2334D *IEICE Transactions on Information and Systems*, vol. E78–D, Aug. 1995, No. 8, Tokyo Japan, pp. 1021–1031.

(List continued on next page.)

*Primary Examiner*—Tuan V. Thai
(74) *Attorney, Agent, or Firm*—Abelman, Frayne & Schwab

(57) ABSTRACT

A method for controlling access to a physical memory in a distributed shared memory system (DSM) includes selecting a page of the physical memory in which to store a plurality of data items, including at least first and second data items. The selected page of the physical memory is divided into a plurality of minipages, including at least first and second minipages containing the first and second data items, respectively. First and second virtual pages are mapped to the selected page of the physical memory, such that the first and second virtual pages are associated respectively with the first and second minipages, with first and second access permissions applied to the first and second virtual pages, respectively. A process is permitted to access the first data item subject to the first access permission and the second data item subject to the second access permission, via the respective first and second virtual pages.

38 Claims, 8 Drawing Sheets

OTHER PUBLICATIONS

Yeung, D., et al., "MGS: A Multigrain Shared Memory System", *Proceedings of the 23rd Annual Symposium on Computer Architecture (ISCA)*, Philadelphia, May 1996, No. Symp. 23, pp. 44–55.

Liu, K. "A Performance Study on Bounteous Transfer in Multiprocessor Sectored Caches", *The Journal of Supercomputing*, vol. 11, No. 4, pp. 405–420, 1997.

Groh, S., "Shadow Stacks—A Hardware–Supported DSM for Objects of any Granularity", *3rd International Conference on Algorithms and Architectures for Parallel Processing*, Melbourne, Aus., pp. 225–238., 1997.

Lowenthal, D. et al., "Using Fine–Grain Threads and Run–Time Decision Making in Parallel Computer", *Journal of Parallel and Distibuted Computing*, vol. 37, No. 1, pp. 41–54, 1996, article No. 0106.

Itzkovitz, A. et al., "Towards Integration of Data Race Detection in DSM Systems", *Special Issue on Software Support for Distributed Computing*, Ahmad & Lau (Ed), TR CS0948, Dept. of Computer Science, Technion, 1998.

Li, K., "Ivy: A Shared Virtual Memory System for Parallel Computing", Chapter 4: *Distributed Shared Memory: Concepts and Systems*, ISBN 0818677376, Aug. 1997, pp. 121–128.

Carter, J. et al., "Implementation and Performance of Munin", Chapter 4: *Distributed Shared Memory: Concepts and Systems*, ISBN 0818677376, Aug. 1997, pp. 129–141.

Schoinas, I. et al., "Fine–grain Access Control for Distributed Shared Memory", Chapter 4: *Distributed Shared Memory: Concepts and Systems*, ISBN 0818677376, Aug. 1997, pp. 228–237.

Keleher, P. et al., "TreadMarks: Distributed Shared Memory on Standard Workstations and Operating Systems", Chapter 4: *Distributed Shared Memory: Concepts and Systems*, ISBN 0818677376, Aug. 1997, pp. 211–227.

Myricom, Inc. homepage, 1994, one page. (*http://www.myricom.com*).

Itzkovitz, A. et al., "Dynamic Adaptation of Sharing Granularity in DSM Systems", *Proc. of the 1999 Int'l Conf. On Parallel Processing (ICPP '99)*, Sep. 1999, pp. 220–227.

Amza, C. et al., "Tradeoffs Between False Sharing and Aggregation in Software Distributed Shared Memory", *Proc. Of th 6th ACM SIGPLAN Symposium on Principles and Practice of Parallel Programming (PPOPP)*, 1997, Las Vegas, pp. 90–99.

Itzkovitz, A. et al., "MultiView and Millipage—Fine Grain Sharing in Page–Based DSMs", *Proc. of the 3rd Symp. On Operating Systems Design and Implementation (OSDI, 1999)*, pp. 215–218.

Scales, D. et al., "Shasta: A Low Overhead, Software–Only Apporach for Supporting Fine–Grained Shared Memorry", *Operating Systems Review*, vol. 30, No. 5, pp. 174–185, Dec. 1996.

Thajchayapong, P. et al., "Design of MURROMAF filters with Equiripple Stopband Attenuation", *Int. Journal of Electronics*, 1989, vol. 67, No. 1, pp. 73–80.

Park, D. et al., "Adaptive Granularity: Transparent Integration of Fine–and Coarse–Grain Communication", *Proc. Of the 1996 Conference on Parallel Architectures and Compilation Techniques*, Boston, Mass., pp. 260–268.

* cited by examiner

DISTRIBUTED SHARED MEMORY SYSTEM WITH VARIABLE GRANULARITY

CROSS-REFERENCE TO RELATED APPLICATIONS

This application is a continuation-in-part of U.S. patent application Ser. No. 09/161,810, now U.S. Pat. No. 6,263,414 filed Sep. 28, 1998. This application further claims the benefit of U.S. Provisional Patent Application No. 60/183,313, filed Feb. 17, 2000. Both of these prior applications are assigned to the assignee of the present patent application and are incorporated herein by reference.

FIELD OF THE INVENTION

The present invention relates generally to control of memory access in computer systems, and specifically to methods for enhancing the efficiency of memory access in distributed shared memory systems.

BACKGROUND OF THE INVENTION

Software-based distributed shared memory (DSM) systems combine the features of shared-memory and distributed-memory multiprocessors. The DSM is typically implemented as a middleware layer, between the operating system and user applications running on host processors that are linked by a local area network (LAN). It enables the application to relate to the local memory of the processor as though it were a coherent cache in a shared memory multiprocessor.

In order to control access to the shared memory by different applications running on the different hosts, software DSMs often rely on virtual memory page protection mechanisms provided by the operating system. The page size of common processors, such as the Intel Pentium™, is typically four kilobytes. In order to maintain memory consistency, all of the hosts maintain the same mapping of virtual memory to physical memory pages. Consequently, when applications running on two or more of the hosts need to access the same page of physical memory, they must take turns accessing the virtual page and swap the contents of the physical page back and forth between them. In page-based systems, this swapping will take place even when the applications are using different items of data, such as variables or other data structures, which are considerably smaller than the total page size and do not overlap. This phenomenon, known as false sharing, can substantially increase the network traffic and degrade performance of the applications running on the system.

The problem of false sharing is well known in DSMs, and various attempts have been made to alleviate it. For example, the requirements for memory consistency among the hosts can be relaxed, as in the Munin system, for example. This system is described by Carter in "Design of the Munin Distributed Shared Memory System," in the *Journal of Parallel and Distributed Computing* 29 (1995), pages 219–227, which is incorporated herein by reference. While relaxing memory consistency can reduce the need for communication among the hosts, it necessitates periodic calls to a synchronization routine, and requires that the application programmer be aware of the semantics of memory behavior and modify his or her code accordingly.

Lowenthal, et al., describe another software-based approach to reducing false sharing in "Using Fine-Grain Threads and Run-Time Decision Making in Parallel Computing," in *Journal of Parallel and Distributed Computing* 37 (1996), pages 41–54, which is incorporated herein by reference. False sharing is detected either at compilation or at run time and is then eliminated by relocating data in the memory. This approach maintains consistency and does not require changes to the host hardware or operating system, but it places limitations on the applications that can run on the system and in some cases adds run-time overhead. Groh et al., also describe an approach based on moving shared objects to different memory regions in "Shadow Stacks—A Hardware-Supported DSM for Objects of Any Granularity," in *Proceedings of the Third International Conference on Algorithms and Architectures for Parallel Processing* (Melbourne, Australia, 1997), pages 225–238, which is incorporated herein by reference.

Another common approach is to reduce the granularity of sharing below the normal page level. For example, the "Shasta" system avoids using the virtual memory protection mechanism of conventional operating systems, and instead relies on instrumentation of the binary application code to provide fine-grained sharing. This system is described by Scales et al. in "Shasta: A Low Overhead, Software-Only Approach for Supporting Fine-Grain Shared Memory," in *Proceedings of the Seventh Symposium on Architectural Support for Programming Languages and Operating Systems AS-PLOSVII* (Cambridge, Mass., 1996), pages 174–185, which is incorporated herein by reference. Aspects of the code instrumentation introduce high overhead, however, necessitating aggressive optimization techniques.

Similarly, Kadiyala et al. describe a new scheme for cache organization that provides fine-grain sharing in "A Dynamic Cache Sub-Block Design to Reduce False Sharing," in *Proceedings of the International Conference on Computer Design: VLSI in Computers and Processors ICCD '95* (Austin, Tex., 1995), pages 313–318, which is incorporated herein by reference. A cache coherence protocol attempts to dynamically locate the point of false reference in a shared memory block, and to partition the block into smaller sub-blocks based on the cache references.

A number of hardware-based approaches have also been proposed for reducing sharing granularity. For example, Jou et al. describe a scheme for reducing false sharing using a hardware extension of a traditional computer memory management unit (MMU) in "Two-Tier Paging and Its Performance Analysis for Network-based Distributed Shared Memory Systems," in *IEEE Transactions on Information and Systems* E78-D (1995), pages 1021–1031, which is incorporated herein by reference.

To summarize, while there are many approaches known in the art for reducing false sharing in a DSM, nearly all of them require basic modifications to either the host and memory hardware or to the operating system (OS) software of the hosts, or to both. Those approaches that stay within the bounds of conventional hardware and OS software and use existing virtual memory protection mechanisms do so at the expense of relaxed consistency and/or special constraints on the application software. There is thus a need for a DSM that can reduce false sharing, preferably by reducing the granularity of sharing, without requiring substantial modification of OS or application software. The DSM should use existing protection mechanisms and should work without incurring substantial management overhead, which would otherwise offset the savings in network traffic due to the reduced sharing granularity.

While decreasing granularity typically leads to a concomitant decrease in false sharing, it also incurs a penalty in terms of the extra overhead required to deal with large blocks of memory data in small-grain units. Amza et al. studied this problem, and reported on their results in "Tradeoffs Between False Sharing and Aggregation in Software Distributed Shared Memory," in *Proceedings of the Sixth ACM SIGPLAN Symposium on Principles and Practice of Parallel Programming PPOPP '97* (Las Vegas, Nev., 1997), pages 90–99, which is incorporated herein by reference. They suggested that page faults should be monitored and used to decide whether pages should be grouped together or separated for purposes of maintaining memory consistency.

In a similar vein, Park et al. described an approach to memory sharing integrating two different protocols, one for small data sets and another for large data sets, in "Adaptive Granularity: Transparent Integration of Fine- and Coarse-Grain Communication," in *Proceedings of the 1996 Conference on Parallel Architectures and Compilation Techniques* (Boston, Mass., 1996), pages 260–268, which is incorporated herein by reference. For small data sets, the granularity is fixed at a cache line, while for large array data, the granularity varies depending on the sharing behavior at run time, by grouping together adjacent data blocks with the same owner. Implementation of the protocol proposed by Park et al. requires special hardware support.

SUMMARY OF THE INVENTION

It is an object of some aspects of the present invention to provide a software DSM system that is capable of operating at reduced granularity, while using existing, conventional hardware and software substantially without modification.

It is a further object of some aspects of the present invention to provide a software DSM system that operates at reduced granularity, using the virtual page protection mechanisms of a standard operating system, while enabling full sequential consistency to be in the distributed memory.

It is yet a further object of some aspects of the present invention to provide a software DSM with a granularity that can vary in the course of executing an application, and which preferably varies adaptively in response to aspects of the execution.

In preferred embodiments of the present invention, a plurality of host processors, interconnected by a network, are configured as a distributed shared memory system using DSM middleware (referred to hereinafter simply as the DSM) running on the processors. Each of the processors has a local physical memory. Applications running on the hosts access data stored in the physical memory by addressing appropriate locations in a shared virtual memory space, which is mapped by the operating system of the hosts to the physical memory. Thus, data items, such as variables and other data structures, may be shared by different hosts.

When multiple data items are located on the same physical memory page, a separate "minipage," smaller than the physical page size, is defined to contain each of the data items. The DSM maps multiple pages of the virtual memory to the same physical memory page, and associates each of the virtual memory pages with a different one of the minipages. These associated virtual pages are referred to herein as different "views" of the physical page. An application that seeks to access one of the data items does so by means of the associated virtual page, or view, and its particular access permissions, as provided by the operating system. In this manner, different hosts, or different processes running on one or more of the hosts, may simultaneously have access permissions to the same physical page through different views of the page. The DSM ensures that each of the hosts or processes accesses only the minipage that is permitted by the associated view. By the same token, a single process may use different views of the same physical page to access different data items on the page.

Thus, the familiar and convenient virtual page protection mechanisms of the operating are used to control access to the memory with a granularity of arbitrary size, which is preferably smaller than the fixed page size of the operating system. The DSM is invoked when an application process running on a given host incurs a page fault, because the view of the minipage that it has requested is not available in the host's local memory. In response to the page fault, the DSM transfers to the local memory only the physical contents of the particular minipage that is required, rather than the entire physical page. The DSM then alters the access permissions granted to the process that requested the minipage with respect to the view (virtual page) associated with the requested minipage, without affecting the permissions applicable to the other views of the same physical page. Preferably, each of the application processes on each of the hosts can have different permission levels with respect to each view (and its associated minipage): no access, read only, or read/write. Most preferably, a "privileged view" is defined for each physical page, with full read/write permission with respect to all of the minipages on the page, for use by the DSM in carrying out the memory transfer operations.

In some preferred embodiments of the present invention, the DSM is capable of varying the granularity of access to the minipages by bunching the minipages together in groups of two or more. Preferably, the DSM associates a basic view (virtual page) with each of the individual minipages, and further defines grouped views that provide access simultaneously to two or more of the minipages. The minipages in two grouped views may be bunched together still further to define a view that relates to a larger group of minipages, with higher levels of bunching reaching an entire page of physical memory or even groups of multiple pages. Alternatively or additionally, the minipages may be arranged so that an application running on a host can bunch minipages by simultaneously requesting a range of consecutive virtual pages that are each associated with one or more of the minipages.

Preferably, the level of granularity of the DSM is controlled by appropriate instructions that are inserted in the source code of an application program that runs on the multiprocessor system. Thus, different levels of granularity may be invoked at different stages in the program so as to provide a granularity at each stage that reduces false sharing without incurring an excessive number of page faults and DSM overhead. Furthermore, different applications may use different levels of granularity—even when the applications are running on the system simultaneously.

Alternatively or additionally, the DSM determines an optimal granularity to be used in each stage of the program. Preferably, when page faults occur and the DSM is set to a coarse granularity, the DSM checks to determine whether different hosts are trying to update different minipages in the same group. If so, the DSM will switch to a finer granularity in order to reduce false sharing. On the other hand, when the DSM is set to a fine granularity, and one of the hosts accesses consecutive minipages in a group in succession, the DSM may determine that a coarser granularity is called for to reduce memory transfer overhead. Two or more granularity levels may be included in such a scheme, with various heuristic criteria for determining when to change granularity. Preferably, the DSM stores the optimal granularity level for each stage in a given application in a history table, so that it can return to the optimal granularity immediately each time the stage recurs.

There is therefore provided, in accordance with a preferred embodiment of the present invention, a method for controlling access to a physical memory in a distributed shared memory system (DSM), which includes a plurality of host processors that are configured to access pages having a predetermined page size in the physical memory, the method including:

selecting one of the pages of the physical memory in which to store a plurality of data items, including at least first and second data items;

dividing the selected page of the physical memory into a plurality of minipages, including at least first and second minipages containing the first and second data items, respectively;

mapping both first and second virtual pages, in a virtual memory space of the processors, to the selected page of the physical memory, such that the first and second virtual pages are associated respectively with the first and second minipages, and the first data item receives a first address on the first virtual page, while the second data item receives a second address on the second virtual page;

applying first and second access permissions to the first and second virtual pages, respectively;

receiving requests by a process running on one of the host processors to access the first and second data items via the respective first and second addresses on the first and second virtual pages; and permitting the process, responsive to the requests, to access the first data item subject to the first access permission and the second data item subject to the second access permission.

Preferably, mapping the first and second virtual pages includes mapping the virtual memory space such that all of the processors access the first and second data items via the same respective addresses on the first and second virtual pages.

Further preferably, applying the first and second access permissions includes applying the permissions substantially independently of one another. Most preferably, receiving the requests includes receiving a first request by a first process running on a first one of the host processors to access the first data item, and a second request by a second process running on a second one of the host processors, and permitting the process to access the data items includes permitting the first process to access the first data item and the second process to access the second data item, subject to the respective access permissions and substantially independently of one another.

In a preferred embodiment, permitting the process to access the first and second data items includes controlling the access permissions so that sequential consistency is maintained in the data items among all of the processors. Preferably, controlling the access permissions includes setting the access permissions for each of the first and second virtual pages on all of the host processors. Further preferably, setting the access permissions includes setting the permissions at each of the host processors to one of the settings in a group of settings consisting of No Access, Read/Write and Read Only. Most preferably, receiving the requests includes receiving a write request by the process to write data to the first minipage, and controlling the access permissions includes setting the permissions for the first virtual page such that the requesting process receives exclusive Read/Write permission for the first virtual page, while other processes running on the host processors receive No Access permission for the first virtual page.

Additionally or alternatively, receiving the requests includes receiving a read request by the process to read data from the first minipage, and permitting the process to access the first data item includes conveying an up-to-date copy of the first data item to the host processor on which the requesting process is running, and controlling the access includes setting the permission for the first virtual page such that the requesting process receives Read Only permission for the first virtual page.

Further additionally or alternatively, receiving the requests includes receiving the request by the process to access the first data item while handling another request to access the first data item by another process, and permitting the process to access the first data item includes queuing the request by the process until the handling of the other request is completed. In a preferred embodiment, the method includes choosing one of the host processors to serve as a DSM manager, and receiving the request and queuing the request include receiving and queuing the request at the manager.

Preferably, the distributed shared memory system is configured such that the physical memory includes a local memory associated with each of the processors, and mapping the virtual pages includes using a local operating system running on each of the processors to map the virtual pages to the local memory of the processor. Further preferably, applying the first and second access permissions includes applying a protection mechanism of the operating system, such that the first and second virtual pages have respective first and second levels of protection. Most preferably, receiving the requests includes receiving a page fault from the operating system when one of the requests violates the protection of the operating system, and permitting the process to access the first and second data items includes altering at least one of the permissions responsive to the page fault so as to permit the process to access the data item.

Additionally or alternatively, permitting the process to access the first data item includes determining whether a copy of the data item in the local memory is up to date and, if so, altering the level of protection of the first virtual page using the protection mechanism of the operating system so as to permit the process to access the data item.

Further additionally or alternatively, permitting the process to access the first data item includes determining whether a copy of the data item in the, local memory is up to date and, if not, requesting an up-to-date copy of the data item from another one of the hosts. In a preferred embodiment, the method includes mapping a privileged virtual page to the selected page of the physical memory, in addition to the first and second virtual pages, the privileged virtual page having a Read/Write access permission to all of the minipages in the selected page, wherein permitting the process to access the first data item includes writing the up-to-date copy of the data item to the local memory using the privileged virtual page.

In a further preferred embodiment, the method includes:

bunching the plurality of minipages together to form minipage groups, each group including two or more of the minipages;

mapping a third virtual page to the selected page of the physical memory, such that the third virtual page is associated with the minipage group containing the first and second minipages, and the first and second data items both receive respective third addresses on the third virtual page;

applying a third access permission to the third virtual page;

receiving a further request by the process to access both of the first and second data items via the respective third addresses on the third virtual page; and permitting the process, responsive to the further request, to access both of the first and second data items subject to the third access permission.

Preferably, bunching the plurality of minipages together includes bunching together two or more of the minipage groups that are not mutually overlapping to form another of the minipage groups.

Additionally or alternatively, receiving the requests by the process to access the first and second data items via the first and second virtual pages includes receiving the requests from an application process during a first, fine-granularity phase of the process, and receiving the further request to access both of the data items via the third virtual page includes receiving the further request during a second, coarse-granularity phase of the process.

In a preferred embodiment, the method includes setting a barrier point in an application program corresponding to the process, at which point the process switches between the fine- and coarse-granularity phases.

In another preferred embodiment, the method includes detecting a pattern of access to the minipages by the host processors, and switching between the fine- and coarse-granularity phases responsive to the pattern. Preferably, detecting the pattern includes detecting, during the coarse-granularity phase, a likelihood of false sharing among the host processors accessing the third virtual page. Additionally or alternatively, detecting the pattern includes detecting, during the fine-granularity phase, that one of the host processors is accessing consecutively a predetermined number of the minipages that are arranged in succession on the page of the physical memory.

Preferably, permitting the process to access the first data item subject to the first access permission, includes, after switching from the coarse- to the fine-granularity phase, determining the third access permission that was in effect in the coarse-granularity phase In still another preferred embodiment, permitting the process to access both of the first and second data items includes conveying to the host processor an up-to-date copy of the first data item from a first one of the other host processors, and conveying an up-to-date copy of the second data item from a second one of the host processors. Preferably, permitting the process to access both of the first and second data items includes setting the third access permission so as to forbid access by the process until the up-to-date copies have been conveyed to the host processor, and then setting the third access permission so as to permit the requested access.

In yet another preferred embodiment, permitting the process to access the first data item subject to the first access permission includes, after permitting the process to access the data items subject to the third access permission, setting the first access permission to enable the process to access the first data item based on the third access permission that was applied previously.

There is also provided, in accordance with a preferred embodiment of the present invention, a method for controlling access to a physical memory in a distributed shared memory system (DSM), which includes a plurality of host processors that are configured to access pages having a predetermined page size in the physical memory, the method including:

selecting a sequence of the pages of the physical memory in which to store a plurality of data items;

dividing each of the pages of the physical memory in the sequence into a plurality of minipages, including at least first and second minipages;

storing a respective first one of the data items in each of the first minipages, and a respective second one of the data items in each of the second minipages, whereby the data items stored in the first minipages constitute a first group, and the data items stored in the second minipages constitute a second group;

mapping respective first and second virtual pages, in a virtual memory space of the processors, to each of the pages of the physical memory in the sequence, such that the first and second virtual pages are associated respectively with the first and second minipages on each of the pages in the physical memory, and the first data item on each of the pages of the physical memory receives a first address on the respective first virtual page, while the second data item on each of the pages of the physical memory receives a second address on the respective second virtual pages;

applying respective access permissions to the virtual pages;

receiving a request by a process running on one of the host processors to access the data items in a selected one of the first and second groups over a sequential range of the pages of the physical memory via the respective addresses on the virtual pages that are associated with the minipages of the selected group; and permitting the process, responsive to the requests, to access the data items over the sequential range subject to the access permissions applied to the virtual pages.

Preferably, mapping the virtual pages includes mapping the first virtual pages in a first consecutive range corresponding to the sequence of the pages of the physical memory, and mapping the second virtual pages in a second consecutive range corresponding to the sequence of the pages of the physical memory.

Additionally or alternatively, receiving the request to access the data items includes receiving a specification of the virtual pages corresponding to the sequential range, including a number of virtual pages between one virtual page and all of the virtual pages corresponding to the minipages in the selected group.

Further additionally or alternatively, permitting the process to access the data items includes altering the access permissions of all of the virtual pages in the sequential range so as to enable the process to access the data items. Preferably, mapping the virtual pages includes using a local operating system running on each of the processors to map the virtual pages to the physical pages in a local memory associated with each of the processors, and altering the access permissions includes altering the permissions for all of the virtual pages in the sequential range with a single operating system call.

In a preferred embodiment, receiving the request includes receiving a first request by the process during a first, fine-granularity phase of the process, to access a single one of the data items in the selected group, and receiving a second request by the process during a second, coarse-granularity phase of the process, to access a multiplicity of the data items over the sequential range.

There is additionally provided, in accordance with a preferred embodiment of the present invention, multiprocessor computing apparatus, including:

a plurality of host processors, which are mutually linked by a data communication network; and a physical memory, arranged as a distributed shared memory among the processors, wherein the processors are configured to access pages having a predetermined page size in the physical memory, wherein the processors are programmed to select one of the pages of the physical memory in which to store a plurality of data items, including at least first and second data items, to divide the selected page of the physical memory into a plurality of minipages, including at least first and second minipages containing the first and second data items, respectively, to map both first and second virtual pages, in a virtual memory space of the processors, to the selected page of the physical memory, such that the first and second virtual pages are associated respectively with the first and second minipages, and the first data item receives a first address on the first virtual page, while the second data item receives a second address on the second virtual page, and to apply first and second access permissions to the first and second virtual pages, respectively, such that upon receiving requests by a process running on one of the host processors to access the first and second data items via the respective first and second addresses on the first and second virtual pages, the processors are adapted to permit the process, responsive to the requests, to access the first data item subject to the first access permission and the second data item subject to the second access permission.

There is further provided, in accordance with a preferred embodiment of the present invention, multiprocessor computing apparatus, including:

a plurality of host processors, which are mutually linked by a data communication network; and a physical memory, arranged as a distributed shared memory among the processors, wherein the processors are configured to access pages having a predetermined page size in the physical memory, wherein the processors are programmed to select a sequence of the pages of the physical memory in which to store a plurality of data items, to divide each of the pages of the physical memory in the sequence into a plurality of minipages, including at least first and second minipages, to store a respective first one of the data items in each of the first minipages, and a respective second one of the data items in each of the second minipages, whereby the data items stored in the first minipages constitute a first group, and the data items stored in the second minipages constitute a second group, to map respective first and second virtual pages, in a virtual memory space of the processors, to each of the pages of the physical memory in the sequence, such that the first and second virtual pages are associated respectively with the first and second minipages on each of the pages in the physical memory, and the first data item on each of the pages of the physical memory receives a first address on the respective first virtual page, while the second data item on each of the pages of the physical memory receives a second address on the respective second virtual pages, and to apply respective access permissions to the virtual pages, such that upon receiving a request by a process running on one of the host processors to access the data items in a selected one of the first and second groups over a sequential range of the pages of the physical memory via the respective addresses on the virtual pages that are associated with the minipages of the selected group, the processors are adapted to permit the process, responsive to the requests, to access the data items over the sequential range subject to the access permissions applied to the virtual pages.

There are also provided, in accordance with preferred embodiments of the present invention, computer software products, for controlling access to a physical memory in a distributed shared memory system (DSM), in accordance with the methods described hereinabove.

The present invention will be more fully understood from the following detailed description of the preferred embodiments thereof, taken together with the drawings in which:

DETAILED DESCRIPTION OF PREFERRED EMBODIMENTS

Figure 1:
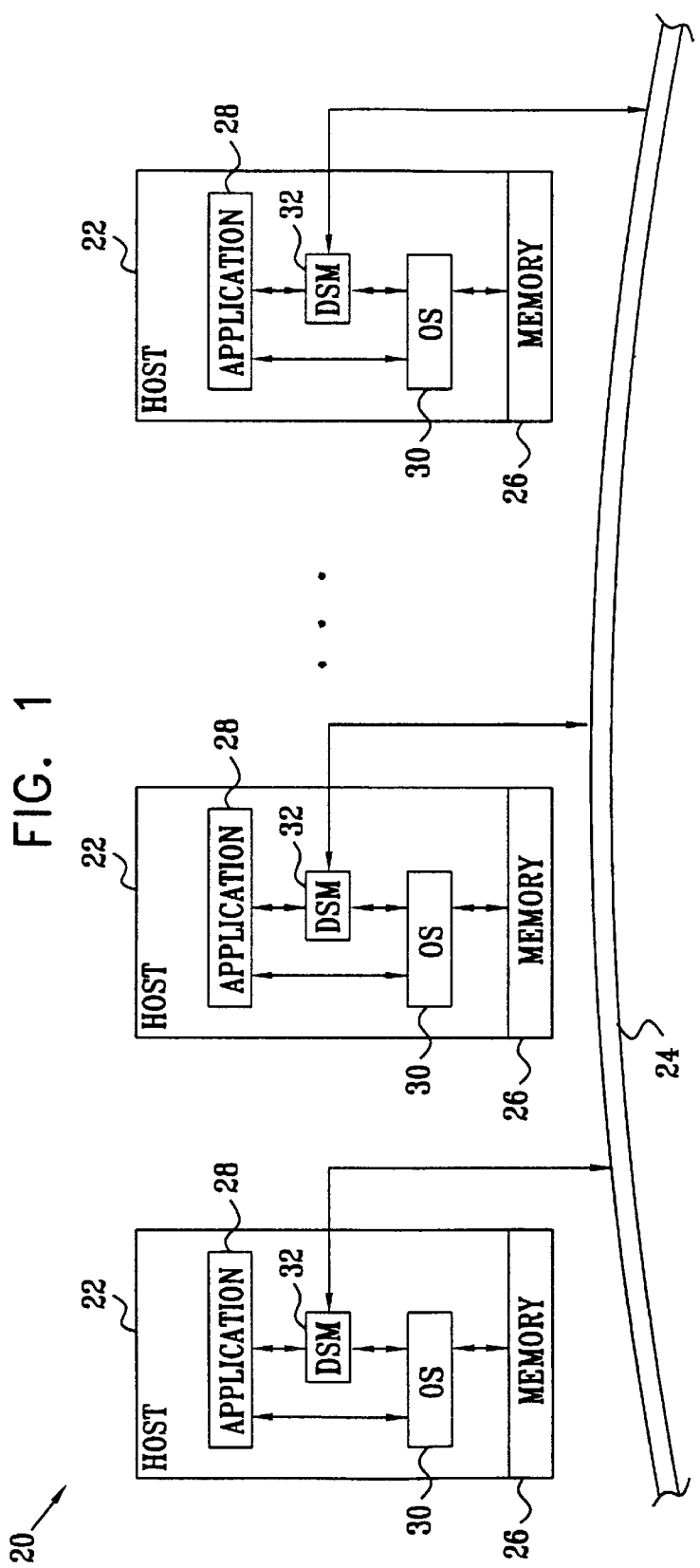
FIG. 1 is a block diagram that schematically illustrates a multiprocessor computing system with distributed shared memory, in accordance with a preferred embodiment of the present invention.

FIG. 1 is a block diagram that schematically illustrates a multiprocessor system 20 with distributed shared memory, in accordance with a preferred embodiment of the present invention. System 20 comprises a plurality of host processors, referred to hereinafter as hosts 22, mutually connected by a local area network (LAN) 24 or other suitable communications bus. Typically, each of the hosts has a local memory 26, which can be accessed by an application program 28 using appropriate commands to an operating system (OS) 30, as is known in the art, such as Microsoft Windows NT™.

Distributed shared memory middleware 32 (referred to hereinafter as DSM 32) on hosts 22 enables applications 28 to treat local memories 26 as a shared memory. The DSM is designed, as described in detail hereinbelow, to allow memory sharing at variable levels of granularity, using memory regions referred to herein as "minipages," which are typically smaller than a physical page of memory 26. By mapping a different page of virtual memory to each minipage in physical memory, the DSM is able to control access to the shared memory using standard page fault and protection mechanisms of OS 30. The middleware may be loaded into hosts 22 over network 24 or, alternatively or additionally, it may be supplied on tangible media, such as CD-ROM.

Figure 2:
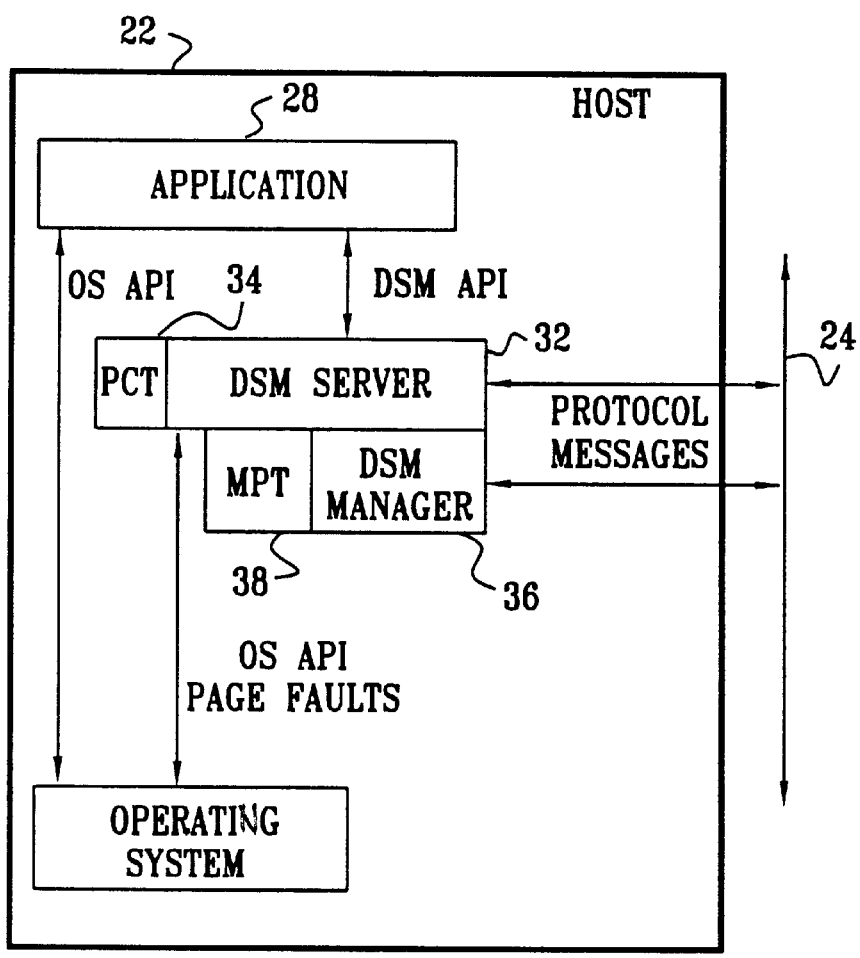
FIG. 2 is a block diagram showing details of software running on one of the processors of FIG. 1, in accordance with a preferred embodiment of the present invention.

FIG. 2 is a block diagram showing details of software structure in one of hosts 22, in accordance with a preferred embodiment of the present invention. DSM 32 is preferably implemented as a server running on each host. The server provides the inter-face between application 28 and the distributed shared memory of system 20. DSM 32 preferably maintains sequential consistency among all of local memories 26, most preferably by using a single-writer/multiple reader protocol. At any point, for any data item defined in the memory, there can be either a single writable copy or one or more read copies. In this way, the DSM enables parallel applications to run on system 20 as through they were executing on a physically-shared memory of a symmetrical multiprocessor (SMP) machine. There is no need for the application programmer or for a compiler to invoke memory synchronization, either implicitly or explicitly.

Figure 3:
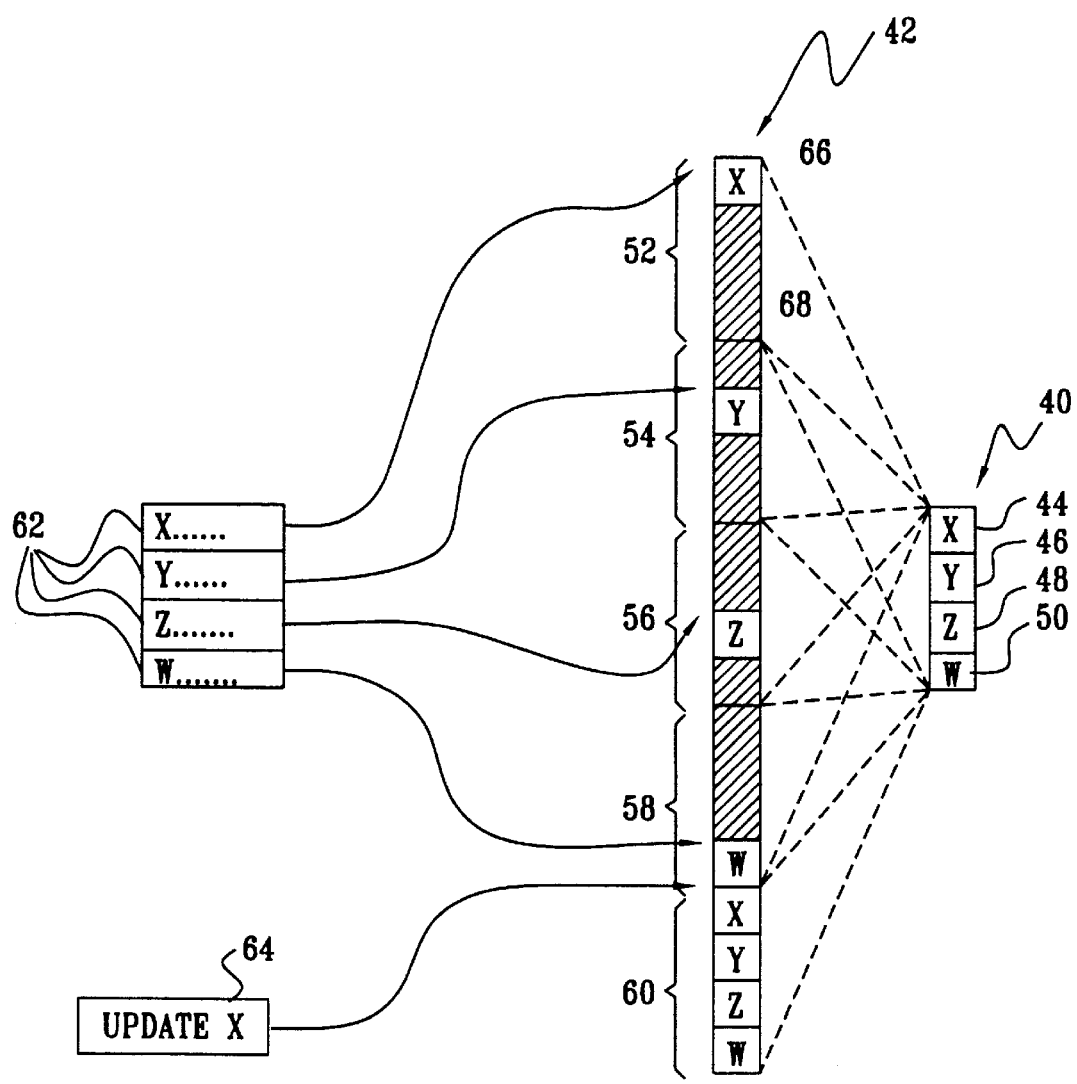
FIG. 3 is a block diagram that schematically illustrates mapping of virtual memory to physical memory in a distributed shared memory system, in accordance with a preferred embodiment of the present invention.

Consequently, the operation of DSM 32 is largely transparent to the application programmer. An application program interface (API) is preferably provided to allow the programmer to access certain DSM functions, such as controlling the granularity of sharing, as described hereinbelow. The programmer should also be aware that typically, only dynamic allocations of memory are managed by the DSM, and these are therefore the only allocations that can be shared. For this reason, the application should be written so that the sharing unit is equal to the allocation size. When the DSM receives an allocation request by the application for a data item on a given minipage, it responds by returning a pointer to the virtual page corresponding to that minipage. This arrangement is shown in FIG. 3 and is explained in detail with reference thereto.

Thus, because DSM 32 maintains sequential consistency, it is particularly simple for an application programmer to use. In other embodiments of the present invention, however, other consistency models may be used, including even multiple consistencies. The methods described herein for using minipages to achieve fine granularity of shared memory are applicable, mutatis mutandis, using these other consistency models, as well.

DSM 32 communicates with OS 30, preferably using a suitable API furnished by the OS provider. In a preferred embodiment, the DSM is implemented as a win32 library on Windows NT, which is linked with the compiled application program. During execution, the application process initiated on host 22 typically runs both application and DSM server threads. Using the API of the OS, the DSM is able to allocate and change the protection of minipages by means of OS kernel operations on standard virtual pages. These DSM functions are typically invoked when the application attempts to access a minipage to which it does not have the proper access permission. This attempted access causes the OS to generate a page fault, which then returns to the DSM for service. Preferably, the DSM server maintains a local protection cache table (PCT) 34 indicating which access permissions are available to it in local memory 26 of its respective host 22 at any given time.

Preferably, a DSM manager 36 maintains a global directory listing the state of each shared minipage. The manager most preferably stores this information in a minipage table (MPT) 38. The directory identifies the minipages, including their sizes and associated virtual memory pages, and indicates which host or hosts are currently holding up-to-date copies of each minipage. When a given host incurs a page fault, DSM 32 sends a request for any missing minipages to the manager, which redirects the request to the appropriate other hosts, as described hereinbelow.

Although manager 36 and MPT 38 provide a convenient means for managing minipages, the principles of the present invention are in no way dependent on the use of these specific means. Other suitable management mechanisms will be apparent to those skilled in the art. Such mechanisms may be based on centralized approaches, distributed (home-based) approaches, pointer forwarding, or other methods known in the art.

FIG. 3 is a block diagram that schematically illustrates mapping of a range of addresses in virtual memory 42 to a page of physical memory 40, in accordance with a preferred embodiment of the present invention. In the present example, the physical memory page holds four data items, such as the values of variables X, Y, Z and W. The value of each variable is held in a respective range of physical addresses in memory 40, which are referred to a minipages 44, 46, 48 and 50, respectively. Although four minipages are used in the present example, it will be understood that larger or smaller minipage divisions may also be used, with correspondingly smaller or greater numbers of minipages in a given physical page. The minipages should not overlap one another, but it is not necessary that they be mutually contiguous.

DSM 32 maps a respective page 52, 54, 56 and 58 of virtual memory 42 to each of minipages 44, 46, 48 and 50. Each of these different virtual memory pages—all of which are mapped to the same physical page in memory 40—is referred to herein as a "view" of the physical page. As in the case of the minipages, the different views need not be mutually contiguous. Each view has a data region 66 corresponding to the actual data in the associated minipage and an undefined region 68 (hatched in FIG. 3) corresponding to the remaining minipages, which are not accessible through the particular view. The address offset of the data region in each view corresponds to the offset of the corresponding minipage in the page of physical memory 40. By the same token, the size of data region 66 is equal to the length of the corresponding data item in the associated minipage.

Application 28 accesses minipages 44, 46, 48 and 50 via pointers 62 to the respective views 52, 54, 56 and 58. Thus, the pointer to variable Y, for example, will be $V_2$+offset(Y), wherein $V_2$ is the starting address of view 54 in the virtual memory space. Any request by the application to access the variable is made by requesting data of the appropriate length beginning at the appropriate pointer location in the virtual memory space. Protection of the data in the minipage is controlled using the virtual memory protection mechanisms provided by OS 30, substantially without modification. The protection level for each of views 52, 54, 56 and 58 is set individually for each application instance on each of hosts 22 to be either Read/Write, Read Only, or No Access. The protection levels are set by DSM 32 in accordance with the requirements of sequential consistency, as described in detail hereinbelow. The offset, length and protection parameters regarding each of the minipages and the view to which it is mapped are preferably stored in MPT 38.

In addition to views 52, 54, 56 and 58, which are available for use by application 28, a further view 60 is preferably used by DSM 32 in order to access memory 26 without the protection constraints that are imposed on the application. View 60, referred to herein as the privileged view, enables the DSM to access all of the minipages with full Read/Write permission. Thus, for example, the DSM can carry out an update 64 of the data in one of the minipages using the privileged view while access to the minipage is blocked in the application views. The privileged view may also be used by the DSM to send and receive minipage contents to and from the user space, while the application views are blocked, without the need for buffer copying. The privileged view thus provides a convenient means for carrying out minipage transfers, but it is not essential to the present invention. Other methods for implementing fine granularity sharing based on the principles of the present invention without resorting to a privileged view will be apparent to those skilled in the art.

Figure 4:
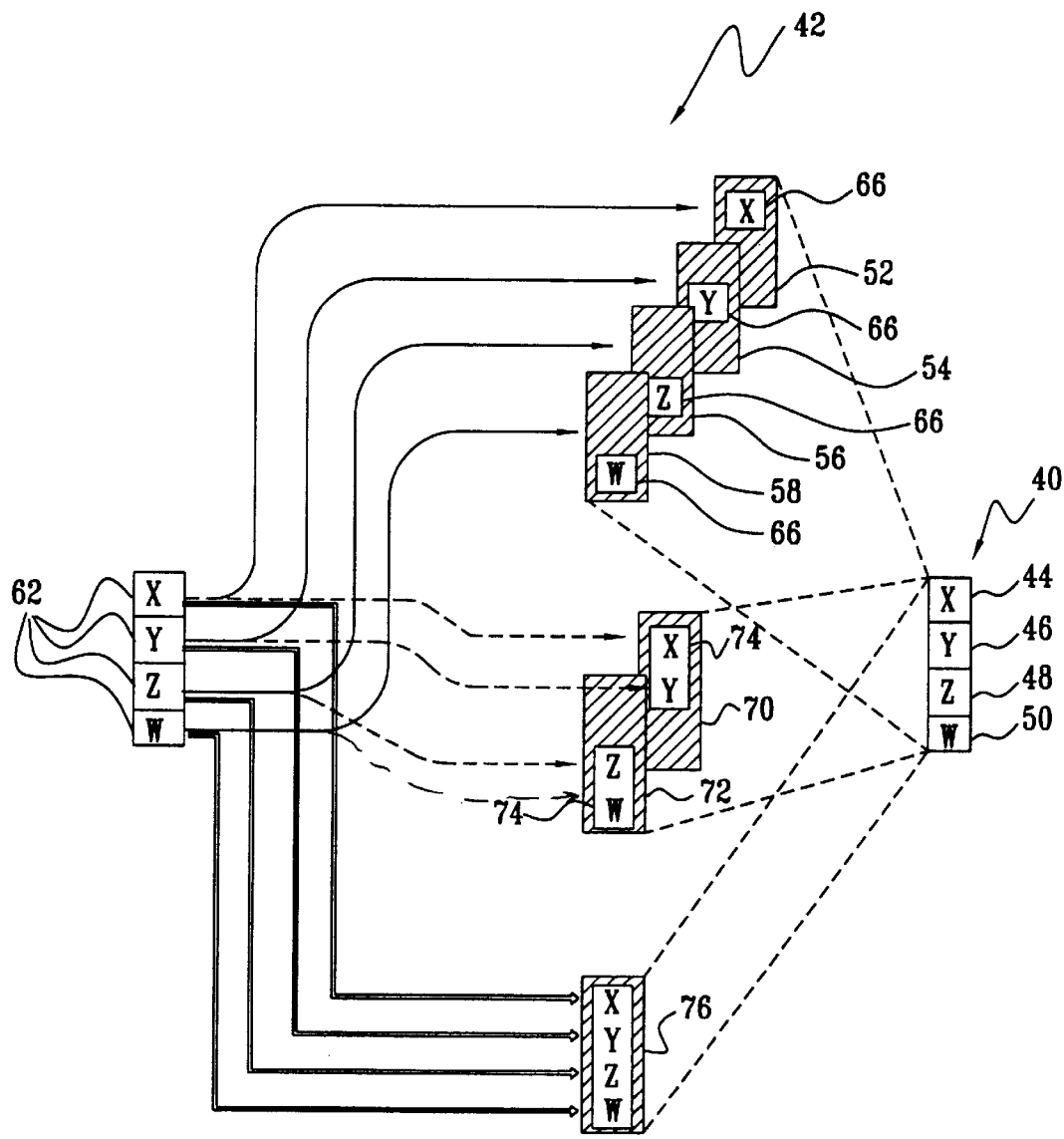
FIG. 4 is a block diagram that schematically illustrates mapping of virtual memory to physical memory in a distributed shared memory system, in accordance with another preferred embodiment of the present invention.

FIG. 4 is a block diagram that schematically illustrates mapping of pages of virtual memory 42 to minipages in physical memory 40, in accordance with another preferred embodiment of the present invention. This embodiment is an extension of the mapping shown in FIG. 3, and is designed to support a number of different levels of granularity in accessing minipage data. In addition to views 52, 54, 56 and 58, corresponding to individual minipages 44, 46, 48 and 50 as described above, the embodiment of FIG. 4 includes "bunched views" 70, 72 and 76, each corresponding to an aggregated group of minipages and having a data region 74 that is expanded accordingly. View 70 is a superposition of views 52 and 54, controlling access simultaneously to minipages 44 and 46, while view 72 is a superposition of views 56 and 58, controlling access to minipages 48 and 50. View 76 is a superposition of views 70 and 72, providing non-privileged access to all of the minipages.

As the bunched views shown in FIG. 4 correspond to contiguous groups of minipages, they can be addressed simply using pointers 62 as described above. On the other hand, it is also possible to define bunched views of non-contiguous minipages, such as a view of minipages 44 and 48 or of minipages 46 and 50. Such views may be useful, for example, in accessing the data in a given row or column of a matrix of variables.

Application 28 running on system 20 may access any of the available views, depending on the desired level of granularity. Preferably, the application programmer annotates the application source code with "barriers," separating different phases of the program. The programmer may also add instructions to change the granularity to a suitably coarser or finer level in each stage. When a barrier is reached in the execution of the application, DSM 32 is instructed to change the granularity level, i.e., to use a different set of the views that is appropriate for the next stage in the program. Alternatively or additionally, DSM 32 may track the data access patterns of the application and the page faults that are incurred, and may then determine autonomously that a granularity switch is required. Mechanisms for granularity switching are described in detail hereinbelow with reference to FIGS. 6-9.

Figure 5:
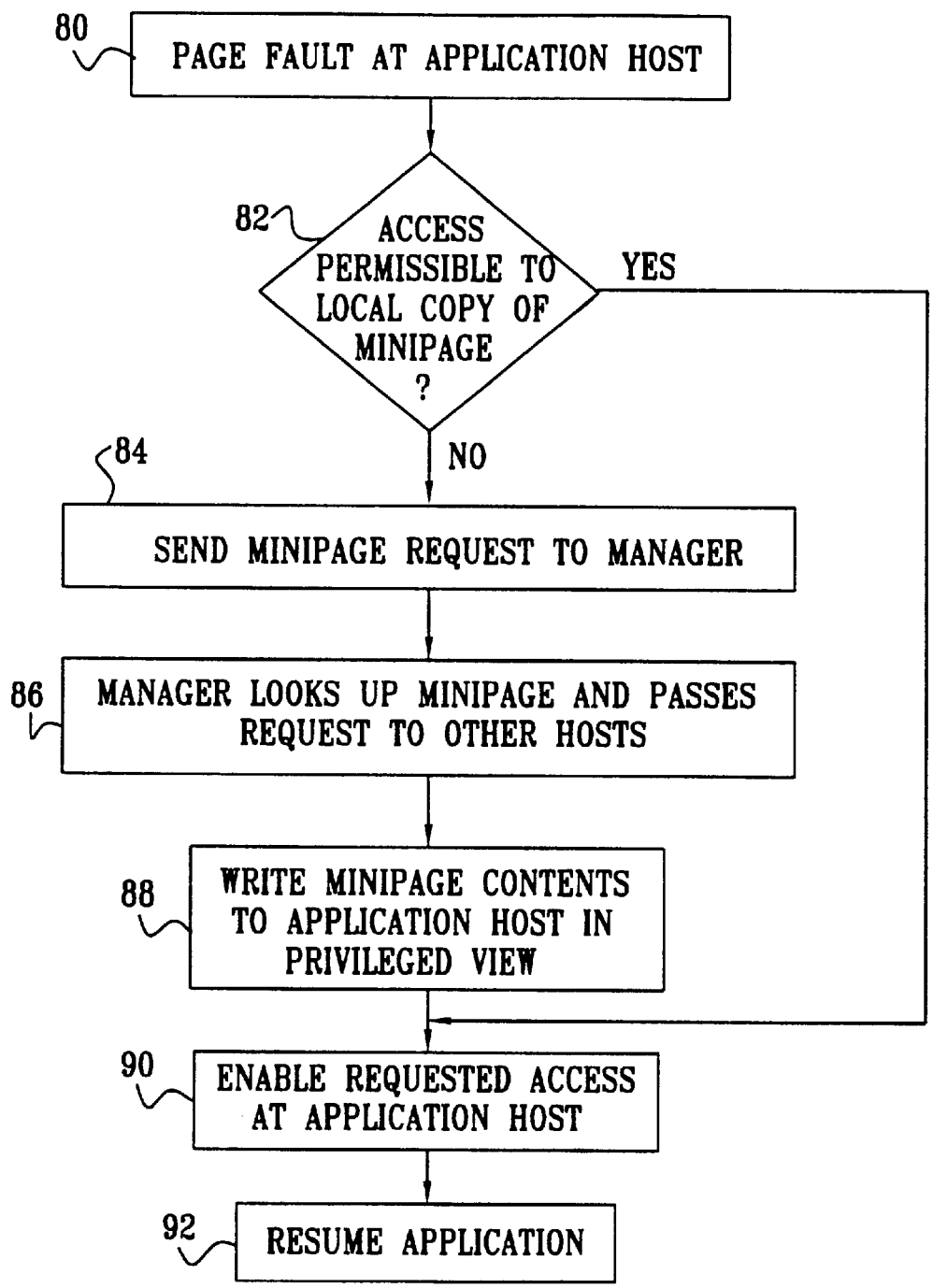
FIG. 5 is a flow chart that schematically illustrates a method for memory access in a distributed shared memory system, in accordance with a preferred embodiment of the present invention.

FIG. 5 is a flow chart that schematically illustrates a method by which DSM 32 controls access to minipages in memory 26 by application 28, in accordance with a preferred embodiment of the present invention. The method of FIG. 5 is invoked whenever the application running on one of hosts 22 attempts to read from or write to a minipage in memory 26 and incurs a page fault, at a faulting step 80. As noted above, the read or write request is directed to the view in the virtual memory space that is associated with the minipage in question. The page fault indicates that the application does not currently have access permission for the requested view.

At a local access step 82, DSM 32 determines whether there is an up-to-date copy of the minipage in local memory 26 of the host. This information may be gleaned from PCT 34 or by exchanging appropriate messages with manager 36. (The PCT is useful particularly in checking on access permissions following changes in granularity, as described below.) If the copy of the minipage is not up to date, the local DSM server submits a request for the associated view to the manager, at a minipage request step 84, and then waits to receive a reply. If the manager receives multiple requests for the same minipage, it queues the later requests until the earlier ones have been serviced, in order to ensure that sequential consistency is maintained at all times. The request message from the local DSM server preferably specifies only the address of the requested view in the virtual memory space. The manager looks up the status of the requested view in MPT 38. Preferably, the MPT also indicates the base address and size of the associated minipage, as well as its address in the privileged view of the physical page on which it is located. In addition, the MPT should contain an indication of which host or hosts currently have up-to-date copies of the minipage in question.

Based on the information gleaned from MPT 38, manager 36 passes on an appropriate message to hosts 22, at a messaging step 86. The message preferably has a header containing the address translation information concerning the minipage that the manager read from the MPT. If the application has requested a read copy of the minipage, the manager forwards the request to a host that has an up-to-date copy, instructing it to transfer the copy to the requesting host. On the basis of the base address and size indicated in the message, the DSM transfers only the data in the requested minipage. The manager also updates the copyset of the minipage that is listed in the MPT. If the application has requested a write copy of the minipage, the manager chooses one of the hosts to send the up-to-date copy to the requesting host, and instructs all of the other hosts to invalidate their copies, i.e., to mark them as "No Access." After the chosen host has forwarded its copy of the minipage to the requesting host, the chosen host invalidates its own copy, as well, in preparation for writing to the copy by the requesting host. This invalidation is necessary in order to maintain sequential consistency.

The copy of the minipage is preferably sent from host to host in a message that has a header containing the original request and the address translation information from MPT 38. At a writing step 88, DSM 32 writes the minipage contents to the appropriate memory location on the requesting host using the privileged view of the appropriate memory page. The DSM then changes the protection for the requesting host of the view corresponding to the requested minipage, at an access enabling step 90. Typically, the protection level is changed from "No Access" to either "Read Only" or "Read/Write," depending on the access that the application requested. In cases in which, at step 82, the DSM determines that the copy of the minipage at the requesting host is already up-to-date, it can go directly to step 90, without having to request that the minipage be sent from another host.

Upon receiving the desired access permission, application 28 resumes execution, at a resumption step 92. Preferably, the host sends an acknowledgment message to manager 36, indicating that the application has resumed. The acknowledgment is useful in preventing race conditions between multiple threads. It also enables the DSM to operate without message queuing in non-manager hosts, since the manager will wait to send any subsequent request message to the non-manager host until the acknowledgment is received.

Messages are conveyed between DSM servers 32 and DSM manager 36 using a simple messaging protocol. As described above, there is no buffer copying, queuing, table lookup or translation of any kind required, except by manager 36. The messages are preferably conveyed using a low-latency messaging protocol layer, such as Myrinet, which is available from Myricom, Inc., of Arcadia, Calif. (www.myricom.com). Preferably, each DSM server has one or more polling and timing threads, which continually check for messages and ensure that outstanding messages are serviced promptly.

Figure 6:
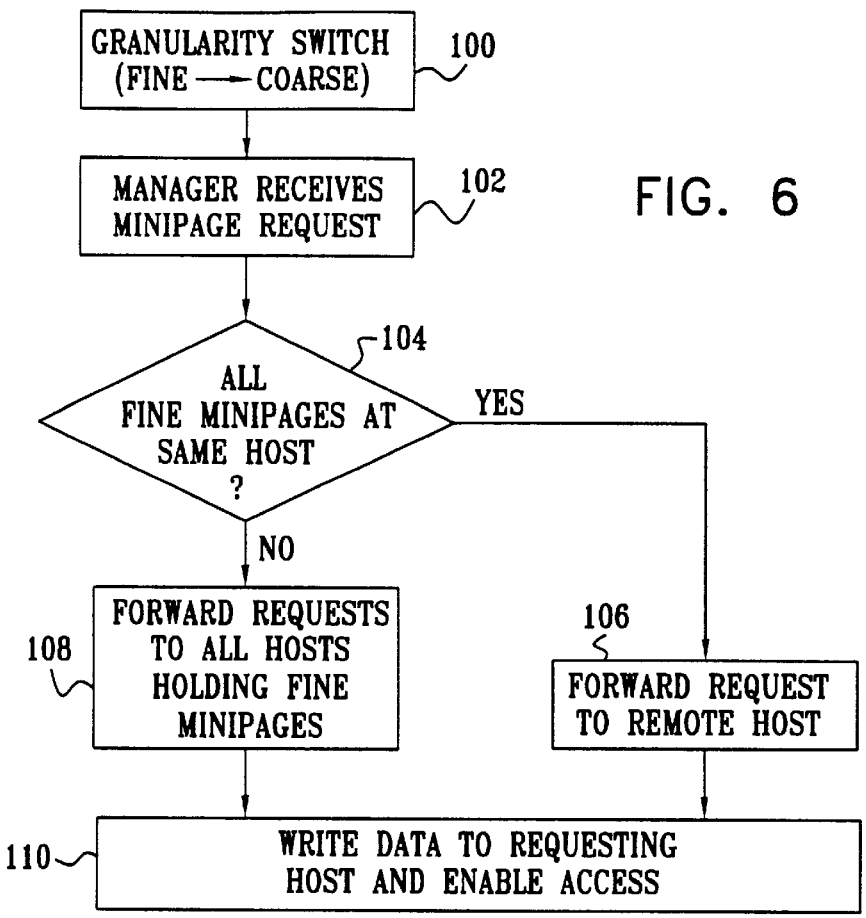
FIGS. 6 and 7 are flow charts that schematically illustrate methods for altering granularity of memory access in a distributed shared memory system in accordance with a preferred embodiment of the present invention.
Figure 7:
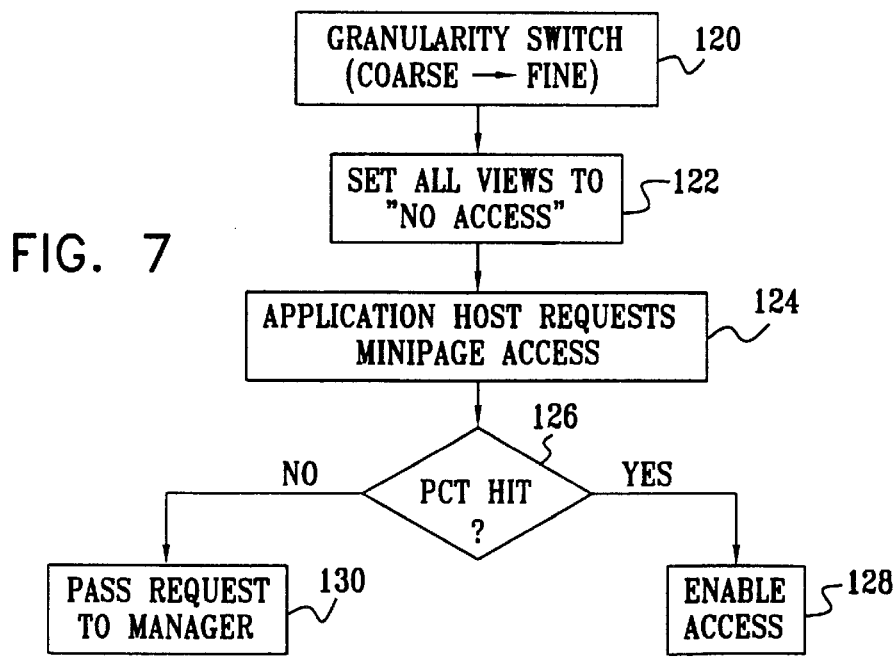

FIGS. 6 and 7 are flow charts that schematically illustrate methods used by DSM 32 to switch between different levels of granularity in controlling access to minipages in system 20, in accordance with a preferred embodiment of the present invention. As noted above, granularity switches may be invoked by an application programmer at different phases of an application. Additionally or alternatively, such switches may be performed automatically by the DSM based on observed sharing behavior of the application. (In addition, different granularities may be defined and used for different groups of variables or other data items.) When a granularity switch occurs, the protection of the appropriate views must be determined and set for the new granularity. In addition, switching to a coarser granularity typically requires exchanging data between the hosts. For efficiency, the data exchange and protection changes are preferably deferred until a given minipage is actually accessed for the first time following a granularity switch.

FIG. 6 illustrates the procedure that is used when a switch from a finer to a coarser granularity is invoked, at a granularity switching step 100. Such a step typically occurs at a "barrier" between different phases of an application, as noted above. The granularity switch could involve, for example, switching from the representation of fine views 52, 54, 56 and 58 to that of coarser views 70 and 72, as shown in FIG. 5. Upon receiving the instruction to switch granularities, all of the views concerned are set to No Access, as noted above.

When manager 36 receives a request to access a coarse view following the granularity switch, at a request step 102, it must determine the locations of the fine minipages that make up the coarse view. Thus, upon receiving a request to access view 70, for example, the manager must determine where up-to-date copies of minipages 44 and 46 can be found. These copies may reside on different hosts.

Preferably, manager 36 uses the data in MPT 38 to find the locations of the component fine-granularity minipages, at a host location step 104. It also determines and to determine whether all of the component minipages are located on the same host, or if they are distributed among multiple hosts. If the requesting host already has up-to-date copies of all of the minipages, then there is no need to collect the data from other hosts. In this case, the manager simply informs the DSM on the requesting host that it may change the protection of the new, coarse view and resume execution of the application. If all of the component minipages are held by a single host other than the requesting host, the manager instructs that host to transfer the required minipage contents to the requesting host, at a single host request step 106. On the other hand, if different component minipages are held by different hosts, the manager must instruct all of them to forward the appropriate items of data to the requesting host, at a multiple host request step 108. Preferably, when several of the component minipages can be found on one of the hosts, the manager batches the requests together to that host in order to reduce communication overhead.

Once all of the data arrive at the requesting host, and the data are stored in local memory 26 (preferably using the privileged view), protection for the coarse minipage is set to Read Only or Read Write as requested, and execution of the application resumes, at an access enabling step 110.

The procedure of FIG. 7 is used when a switch from coarse to fine granularity is invoked, at an invocation step 120. Here, too, as in the method of FIG. 6, all views are initially set to No Access following the granularity switch, at an access removal step 122. Although the protection of fine views 52 and 54 on a given host could be set immediately based on the existing permission for coarse view 70, for example, many calls to OS 30 would be required in order to set the protection of all of the fine views in this manner, and at least some of these calls are probably superfluous. Therefore, although the access permissions for the coarse views are held by the DSM server for each host in the local PCT 34 (FIG. 2), they are not immediately implemented at the fine level.

When one of hosts 22 does request access to a minipage following the granularity switch, at an access request step 124, the No Access state of the corresponding view causes a page fault. DSM 32 on the requesting host checks in PCT 34 to determine whether in the coarse phase, the host held access permission to the coarse view corresponding to the minipage for which the current fine view is requested. If so (a PCT "hit"), the DSM can immediately grant access to the fine view without jeopardizing memory consistency, at an access enablement step 128. The access is changed locally, without the need for an access request to manager 36. Furthermore, in the same access change operation, when there are other fine views whose associated minipages belong to the same coarse view, the DSM preferably changes the access permissions of all of these fine views, in order to prevent subsequent page faults and OS calls. The fine views are preferably arranged sequentially in the virtual memory space, so that a single OS call can be used to change the permissions of all of the fine views at once.

On the other hand, when there is no PCT hit at step 128, DSM 32 must pass the access request submitted by the host to manager 36, at a manager request step 130. The request is processed in the usual way, substantially as illustrated in FIG. 5.

Table I below is a pseudocode listing of a protocol used for granularity switching, used in implementing the methods of FIGS. 6 and 7. The array of pointers to the data items at the old granularity is translated into an array of pointers at the new granularity. The expression "message_start . . . message_end" used in the table refers to the range of the minipages of the finest granularity that are contained in the "message_minipage" (the accessed minipage). "DATASET" refers to a minimal set of hosts that together have copies of all of the minipages in the range, while "PROTECTSET" is the set of all the hosts that have copies of some of these minipages.

TABLE I

GRANULARITY SWITCHING FOR ADAPTIVE SHARING

Requester on Read or Write Fault:

If the minipage has an entry in the PCT with an
appropriate permission
    Change the protection of the minipage to the one
    stored in the PCT
    Resume application
Else
    message_type = GET_COPY or GET_EXCLUSIVE
    message_from = MY_PID
    message_minipage = accessed minipage
    Send the request message to the manager
    Wait for reply messages
Requester on Reply message:

If message_type is GET_COPY or GET_EXCLUSIVE
    Receive data
If last reply
    If message_type is GET_COPY
        Set PCT entries of message_start . . . message_end
        to ReadOnly
        Set access of message_minipage to ReadOnly
    Else
        Set PCT entries of message_start . . . message_end
        to ReadWrite
        Set access of message_minipage to ReadWrite
    message_type = ACK
    Send message to manager
    Resume application
Replier on Request message:

If message_type is GET_COPY
    Set PCT entries of requested_minipages to ReadOnly
    If the replier has copies of all the minipages in
    message_start . . . message_end
Set access of message_minipage to ReadOnly
If message_type is GET_EXCLUSIVE or INVALIDATE
    Set PCT entries of message_start . . . message_end
    to NoAccess
    Set access of message_minipage to NoAccess
If message_type is GET_EXCLUSIVE or GET_COPY
    Send message with data of requested_minipages
    to message_from
If message_type is INVALIDATE
    Send message to message_from
Host on Granularity Switch Barrier:

Execute regular barrier
For each of the pointers in the input array
    Compute pointer in the new granularity
    Update the application's pointers array
Set access of virtual address range of the target
minipages to NoAccess
Execute regular barrier
Manager on Request message:

Find minipages range message_start . . . message_end
If message_type is GET_COPY
    Wait for non-exclusive lock on message_start . . .
    message_end
    Find DATASET
    For each host in DATASET
        Send message to host specifying its
        requested_minipages subranges
If message_type is GET_EXCLUSIVE
    Wait for exclusive lock
    on message_start . . . message_end
    Find DATASET and PROTECTSET
    For each host in PROTECTSET
        If the host is in DATASET
            Send message to host specifying
            its requested_minipages subranges
        Else
            message_type = INVALIDATE
            Send message to host

TABLE I-continued

GRANULARITY SWITCHING FOR ADAPTIVE SHARING

Figure 8:
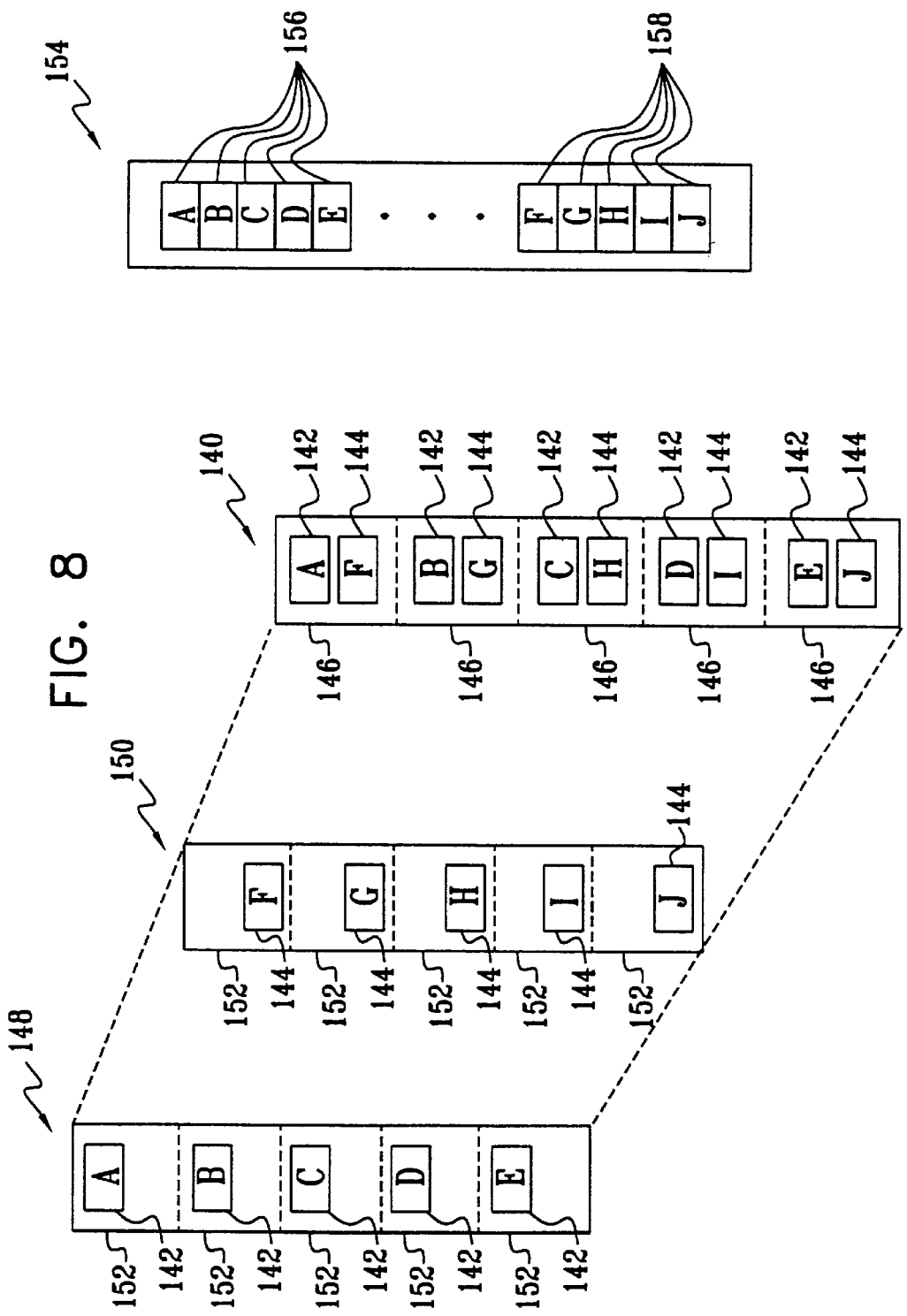
FIG. 8 is a block diagram that schematically illustrates mapping of virtual memory to physical memory in a distributed shared memory system, in accordance with yet another preferred embodiment of the present invention.

Manager on ACK message:

For each minipage in range message_start . . . message_end
    Update copyset of minipage
    Release lock on minipage FIG. 8 is a block diagram that schematically illustrates mapping of pages 152 of virtual memory to pages 146 of physical memory, in accordance with still another preferred embodiment of the present invention. Each of pages 152 provides a fine-granularity view of a corresponding minipage 142 or 144. These fine views are grouped together in composed (coarse), multi-page views 148 and 150, covering an entire range 140 of pages 146 in the physical memory. The mapping shown in FIG. 8 provides a particularly simple and efficient mechanism for switching among different granularity levels during execution of an application. As explained below, this mapping scheme makes it possible to dispense with PCT 34. It also allows different hosts to use different granularity levels simultaneously and eliminates the need to synchronize granularity switches at barriers in the program, as in the embodiments described above.

To build the views shown in FIG. 8, each successive data item is placed at the beginning of the next unused physical page 146. Thus, DSM 32 stores variables A, B, C, D and E in succession at the beginning of successive pages, creating a group of minipages 142 in the present example. Once an item is allocated on each page in range 140, the DSM continues adding data elements cyclically (variables F, G, H, I and J) to the remaining free space in the pages, creating a second group of minipages 144. As a result of this method of memory allocation, a Page Table Entry (PTE) table 154, which reflects the mapping of virtual memory pages 152 to physical pages 146, has entries 156, corresponding to minipages 142, listed in sequence in one part of the table and entries 158, corresponding to minipages 144, listed in sequence in a subsequent part of the table. Composed views 148 and 150 can then be invoked simply by referring to the range of entries 156 or to the range of entries 158 in a single OS call. Any sequential subset of the range can be invoked in like manner.

The scheme of FIG. 8 can thus be used to conveniently to address minipages 142 and 144 at various different granularity levels, and even with different granularities on different hosts 22 at the same time. Coherence among the hosts is maintained by a protocol similar to that shown above in Table I, with suitable modification to deal with the ranges of virtual pages 152 that make up a composed view. For hosts working at the level of granularity of composed views, the access permission for the entire multi-page view (as long as the pages are consecutive) can be changed with a single system call in Windows NT and in other, similar operating systems. When a host working at coarse granularity incurs a page fault and requests a composed view, manager 36 uses the appropriate system calls and messages to bring the required minipages from the other hosts, even when those hosts are working at a finer granularity. By the same token, a host working at fine granularity can request and receive a minipage that is associated with a virtual page in a composed view held by another host.

Figure 9:
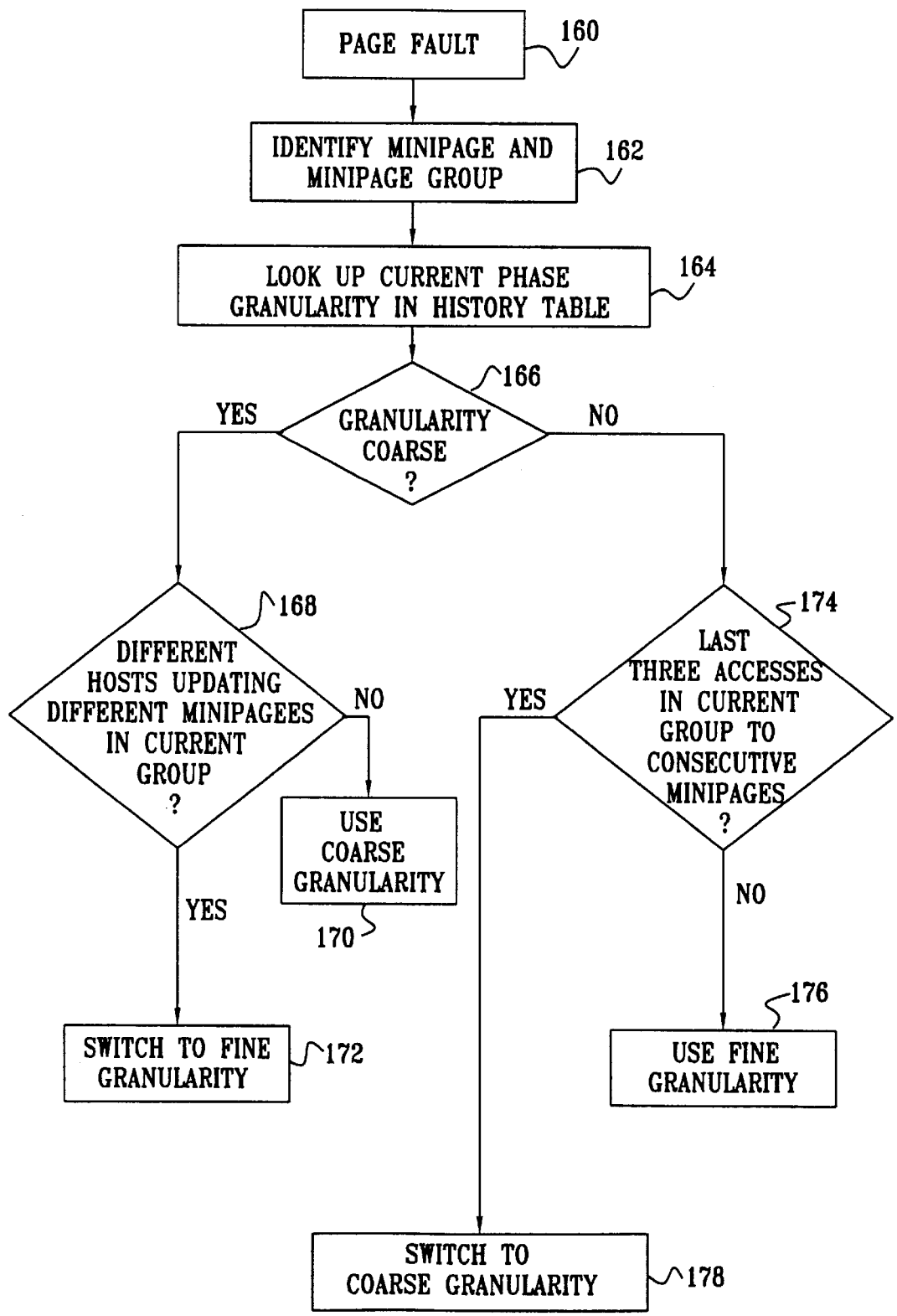
FIG. 9 is a flow chart that schematically illustrates another method for altering granularity of memory access in a distributed shared memory system.

FIG. 9 is a flow chart that schematically illustrates a method for automatic switching of granularity of memory sharing in system 20, in accordance with a preferred embodiment of the present invention. The method is described with particular reference to the type of mapping between views and minipages that is shown in FIG. 8, but it can also be implemented, mutatis mutandis, in other minipage-based schemes. It is based on identifying contention between hosts 22 trying to access groups of minipages concurrently. DSM 32 uses heuristic criteria to split or recombine the groups accordingly. While this method of automatic granularity switching is described hereinbelow with reference to only two granularity levels—coarse and fine—it can be adapted in a straightforward way to work with three or more levels.

The method of FIG. 9 assumes that there is an optimal sharing granularity to be found in each phase of a given application program. Beginning from a default of coarse sharing, the DSM attempts to choose and then to refine the granularity for each phase until an optimum is found. The results are stored in a history table, to which the DSM refers when it returns again to the same phase of the program. The history table holds the following information:

Phase ID: An identifier of the current program phase. Preferably, the program counter is used to identify each barrier that has been set in the program. The barriers are typically set by the application programmer, using an API provided for the DSM.

Barrier Granularity: The initial granularity (coarse or fine) of all of the shared variables during the current phase. This granularity is used for all the variables until the first composite sharing unit is split or the phase ends.

Minipage Groups List: A list of non-overlapping minipage groups, wherein each group corresponds to a potential composite view.

For each of the minipage groups, the following information is stored in the history table:

Group Granularity: The current granularity of the group (coarse or fine).

Accessor PID: The ID of the last processor that accessed any minipage in the group.

Accessed Minipage: The last accessed minipage in the group.

Access Step: The difference between the last two accessed minipages in the group.

This information is used to assess whether different hosts are attempting to update different minipages in the same group or, alternatively, whether one host is attempting to access successively consecutive minipages in the group.

The method of FIG. 9 is invoked whenever a page fault is incurred by application 28 in attempting to access a data item in memory 30, at a faulting step 160. The DSM identifies the minipage at which the page fault occurred and the minipage group to which the minipage belongs, as listed in the history table, at an identification step 162. The DSM checks the current phase of the application as listed in the history table, based on the program counter, at a lookup step 164. It thus determines what the granularity for the current phase should be, at a granularity checking step 166. As noted above, the granularity for all of the phases is preferably set initially to coarse, but this setting is likely to change in the course of running the application.

Following step 166, if the granularity setting is coarse, the DSM checks the history table to determine whether different hosts have tried to update different minipages in the current minipage group during the current phase, at an update checking step 168. If this kind of updating has not occurred, it means that the coarse granularity is probably appropriate for this group. The DSM then serves the current page fault using coarse granularity, at a coarse continuation step 170. On the other hand, if different hosts are updating adjacent minipages, it is an indication that the coarse granularity is probably causing false sharing in the group. In this case, the current page fault is served at fine granularity, in a fine switching step 172. This switch is preferably recorded in the history table for reference the next time the program reaches this phase.

On the other hand, if the DSM determines at step 166 that the granularity setting for the current group is fine, it then checks the last three accesses to the group as recorded in the history table, at an access checking step 174. (Of course, the decision to check three accesses is heuristic, and larger or smaller numbers of accesses may be checked instead.) If the last three accesses were made by a single host to consecutive minipages in the group, such as minipages 142 holding variables A, B and C in the example of FIG. 8, it is an indication that the host is probably attempting to access the entire group of minipages associated with composed view 148. If this is not the case, the DSM preferably serves the current page fault at fine granularity, without a granularity switch, at a fine continuation step 176. Otherwise, when a single host has accessed three consecutive minipages, the DSM sets the entire group to coarse granularity, at a coarse switching step 178, and serves the page fault at this granularity.

Although preferred embodiments are described hereinabove with reference to a particular configuration of system 20 and certain specific sharing protocols, the principles of the present invention may also be applied for other purposes and in other contexts in which shared memories are used. As one example (which is described in detail in the above-mentioned U.S. provisional patent application), elements of the present invention may be used in detecting race conditions in programs written for distributed share memory systems. The DSM messages are monitored, and accesses to variables are logged in a protection cache. Timing of the access operations can be analyzed to detect race conditions on the fly. Other applications of the principles of the present invention will be apparent to those skilled in the art.

It will thus be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

What is claimed is:

1. A method for controlling access to a physical memory in a distributed shared memory system (DSM), which includes a plurality of host processors that are configured to access pages having a predetermined page size in the physical memory, the method comprising:

selecting one of the pages of the physical memory in which to store a plurality of data items, including at least first and second data items;

dividing the selected page of the physical memory into a plurality of minipages, including at least first and second minipages containing the first and second data items, respectively;

mapping both first and second virtual pages, in a virtual memory space of the processors, to the selected page of the physical memory, such that the first and second virtual pages are associated respectively with the first and second minipages, and the first data item receives a first address on the first virtual page, while the second data item receives a second address on the second virtual page;

applying first and second access permissions to the first and second virtual pages, respectively;

receiving requests by a process running on one of the host processors to access the first and second data items via the respective first and second addresses on the first and second virtual pages; and permitting the process, responsive to the requests, to access the first data item subject to the first access permission and the second data item subject to the second access permission.

2. A method according to claim 1, wherein mapping the first and second virtual pages comprises mapping the virtual memory space such that all of the processors access the first and second data items via the same respective addresses on the first and second virtual pages.

3. A method according to claim 1, wherein applying the first and second access permissions comprises applying the permissions substantially independently of one another.

4. A method according to claim 3, wherein receiving the requests comprises receiving a first request by a first process running on a first one of the host processors to access the first data item, and a second request by a second process running on a second one of the host processors, and wherein permitting the process to access the data items comprises permitting the first process to access the first data item and the second process to access the second data item, subject to the respective access permissions and substantially independently of one another.

5. A method according to claim 1, wherein permitting the process to access the first and second data items comprises controlling the access permissions so that sequential consistency is maintained in the data items among all of the processors.

6. A method according to claim 5, wherein controlling the access permissions comprises setting the access permissions for each of the first and second virtual pages on all of the host processors.

7. A method according to claim 6, wherein setting the access permissions comprises setting the permissions at each of the host processors to one of the settings in a group of settings consisting of No Access, Read/Write and Read Only.

8. A method according to claim 7, wherein receiving the requests comprises receiving a write request by the process to write data to the first minipage, and wherein controlling the access permissions comprises setting the permissions for the first virtual page such that the requesting process receives exclusive Read/Write permission for the first virtual page, while other processes running on the host processors receive No Access permission for the first virtual page.

9. A method according to claim 7, wherein receiving the requests comprises receiving a read request by the process to read data from the first minipage, and wherein permitting the process to access the first data item comprises conveying an up-to-date copy of the first data item to the host processor on which the requesting process is running, and wherein controlling the access comprises setting the permission for the first virtual page such that the requesting process receives Read Only permission for the first virtual page.

10. A method according to claim 5, wherein receiving the requests comprises receiving the request by the process to access the first data item while handling another request to access the first data item by another process, and wherein permitting the process to access the first data item comprises queuing the request by the process until the handling of the other request is completed.

11. A method according to claim 10, and comprising choosing one of the host processors to serve as a DSM manager, and wherein receiving the request and queuing the request comprise receiving and queuing the request at the manager.

12. A method according to claim 1, wherein the distributed shared memory system is configured such that the physical memory comprises a local memory associated with each of the processors, and wherein mapping the virtual pages comprises using a local operating system running on each of the processors to map the virtual pages to the local memory of the processor.

13. A method according to claim 12, wherein applying the first and second access permissions comprises applying a protection mechanism of the operating system, such that the first and second virtual pages have respective first and second levels of protection.

14. A method according to claim 13, wherein receiving the requests comprises receiving a page fault from the operating system when one of the requests violates the protection of the operating system, and wherein permitting the process to access the first and second data items comprises altering at least one of the permissions responsive to the page fault so as to permit the process to access the data item.

15. A method according to claim 13, wherein permitting the process to access the first data item comprises determining whether a copy of the data item in the local memory is up to date and, if so, altering the level of protection of the first virtual page using the protection mechanism of the operating system so as to permit the process to access the data item.

16. A method according to claim 13, wherein permitting the process to access the first data item comprises determining whether a copy of the data item in the local memory is up to date and, if not, requesting an up-to-date copy of the data item from another one of the hosts.

17. A method according to claim 16, and comprising mapping a privileged virtual page to the selected page of the physical memory, in addition to the first and second virtual pages, the privileged virtual page having a Read/Write access permission to all of the minipages in the selected page, wherein permitting the process to access the first data item comprises writing the up-to-date copy of the data item to the local memory using the privileged virtual page.

18. A method according to claim 1, and comprising:

bunching the plurality of minipages together to form minipage groups, each group comprising two or more of the minipages;

mapping a third virtual page to the selected page of the physical memory, such that the third virtual page is associated with the minipage group containing the first and second minipages, and the first and second data items both receive respective third addresses on the third virtual page;

applying a third access permission to the third virtual page;

receiving a further request by the process to access both of the first and second data items via the respective third addresses on the third virtual page; and permitting the process, responsive to the further request, to access both of the first and second data items subject to the third access permission.

19. A method according to claim 18, wherein bunching the plurality of minipages together comprises bunching together two or more of the minipage groups that are not mutually overlapping to form another of the minipage groups.

20. A method according to claim 18, wherein receiving the requests by the process to access the first and second data items via the first and second virtual pages comprises receiving the requests from an application process during a first, fine-granularity phase of the process, and wherein receiving the further request to access both of the data items via the third virtual page comprises receiving the further request during a second, coarse-granularity phase of the process.

21. A method according to claim 20, and comprising setting a barrier point in an application program corresponding to the process, at which point the process switches between the fine- and coarse-granularity phases.

22. A method according to claim 20, and comprising detecting a pattern of access to the minipages by the host processors, and switching between the fine- and coarse-granularity phases responsive to the pattern.

23. A method according to claim 22, wherein detecting the pattern comprises detecting, during the coarse-granularity phase, a likelihood of false sharing among the host processors accessing the third virtual page.

24. A method according to claim 22, wherein detecting the pattern comprises detecting, during the fine-granularity phase, that one of the host processors is accessing consecutively a predetermined number of the minipages that are arranged in succession on the page of the physical memory.

25. A method according to claim 20, wherein permitting the process to access the first data item subject to the first access permission, comprises, after switching from the coarse- to the fine-granularity phase, determining the third access permission that was in effect in the coarse-granularity phase.

26. A method according to claim 18, wherein permitting the process to access both of the first and second data items comprises conveying to the host processor an up-to-date copy of the first data item from a first one of the other host processors, and conveying an up-to-date copy of the second data item from a second one of the host processors.

27. A method according to claim 26, wherein permitting the process to access both of the first and second data items comprises setting the third access permission so as to forbid access by the process until the up-to-date copies have been conveyed to the host processor, and then setting the third access permission so as to permit the requested access.

28. A method according to claim 18, wherein permitting the process to access the first data item subject to the first access permission comprises, after permitting the process to access the data items subject to the third access permission, setting the first access permission to enable the process to access the first data item based on the third access permission that was applied previously.

29. A method for controlling access to a physical memory in a distributed shared memory system (DSM), which includes a plurality of host processors that are configured to access pages having a predetermined page size in the physical memory, the method comprising:

selecting a sequence of the pages of the physical memory in which to store a plurality of data items;

dividing each of the pages of the physical memory in the sequence into a plurality of minipages, including at least first and second minipages;

storing a respective first one of the data items in each of the first minipages, and a respective second one of the data items in each of the second minipages, whereby the data items stored in the first minipages constitute a first group, and the data items stored in the second minipages constitute a second group;

mapping respective first and second virtual pages, in a virtual memory space of the processors, to each of the pages of the physical memory in the sequence, such that the first and second virtual pages are associated respectively with the first and second minipages on each of the pages in the physical memory, and the first data item on each of the pages of the physical memory receives a first address on the respective first virtual page, while the second data item on each of the pages of the physical memory receives a second address on the respective second virtual pages;

applying respective access permissions to the virtual pages;

receiving a request by a process running on one of the host processors to access the data items in a selected one of the first and second groups over a sequential range of the pages of the physical memory via the respective addresses on the virtual pages that are associated with the minipages of the selected group; and permitting the process, responsive to the requests, to access the data items over the sequential range subject to the access permissions applied to the virtual pages.

30. A method according to claim 29, wherein mapping the virtual pages comprises mapping the first virtual pages in a first consecutive range corresponding to the sequence of the pages of the physical memory, and mapping the second virtual pages in a second consecutive range corresponding to the sequence of the pages of the physical memory.

31. A method according to claim 29, wherein receiving the request to access the data items comprises receiving a specification of the virtual pages corresponding to the sequential range, comprising a number of virtual pages between one virtual page and all of the virtual pages corresponding to the minipages in the selected group.

32. A method according to claim 29, wherein permitting the process to access the data items comprises altering the access permissions of all of the virtual pages in the sequential range so as to enable the process to access the data items.

33. A method according to claim 32, wherein mapping the virtual pages comprises using a local operating system running on each of the processors to map the virtual pages to the physical pages in a local memory associated with each of the processors, and wherein altering the access permissions comprises altering the permissions for all of the virtual pages in the sequential range with a single operating system call.

34. A method according to claim 29, wherein receiving the request comprises receiving a first request by the process during a first, fine-granularity phase of the process, to access a single one of the data items in the selected group, and receiving a second request by the process during a second, coarse-granularity phase of the process, to access a multiplicity of the data items over the sequential range.

35. Multiprocessor computing apparatus, comprising:

a plurality of host processors, which are mutually linked by a data communication network; and a physical memory, arranged as a distributed shared memory among the processors, wherein the processors are configured to access pages having a predetermined page size in the physical memory, wherein the processors are programmed to select one of the pages of the physical memory in which to store a plurality of data items, including at least first and second data items, to divide the selected page of the physical memory into a plurality of minipages, including at least first and second minipages containing the first and second data items, respectively, to map both first and second virtual pages, in a virtual memory space of the processors, to the selected page of the physical memory, such that the first and second virtual pages are associated respectively with the first and second minipages, and the first data item receives a first address on the first virtual page, while the second data item receives a second address on the second virtual page, and to apply first and second access permissions to the first and second virtual pages, respectively, such that upon receiving requests by a process running on one of the host processors to access the first and second data items via the respective first and second addresses on the first and second virtual pages, the processors are adapted to permit the process, responsive to the requests, to access the first data item subject to the first access permission and the second data item subject to the second access permission.

36. Multiprocessor computing apparatus, comprising:

a plurality of host processors, which are mutually linked by a data communication network; and a physical memory, arranged as a distributed shared memory among the processors, wherein the processors are configured to access pages having a predetermined page size in the physical memory, wherein the processors are programmed to select a sequence of the pages of the physical memory in which to store a plurality of data items, to divide each of the pages of the physical memory in the sequence into a plurality of minipages, including at least first and second minipages, to store a respective first one of the data items in each of the first minipages, and a respective second one of the data items in each of the second minipages, whereby the data items stored in the first minipages constitute a first group, and the data items stored in the second minipages constitute a second group, to map respective first and second virtual pages, in a virtual memory space of the processors, to each of the pages of the physical memory in the sequence, such that the first and second virtual pages are associated respectively with the first and second minipages on each of the pages in the physical memory, and the first data item on each of the pages of the physical memory receives a first address on the respective first virtual page, while the second data item on each of the pages of the physical memory receives a second address on the respective second virtual pages, and to apply respective access permissions to the virtual pages, such that upon receiving a request by a process running on one of the host processors to access the data items in a selected one of the first and second groups over a sequential range of the pages of the physical memory via the respective addresses on the virtual pages that are associated with the minipages of the selected group, the processors are adapted to permit the process, responsive to the requests, to access the data items over the sequential range subject to the access permissions applied to the virtual pages.

37. A computer software product, for controlling access to a physical memory in a distributed shared memory system (DSM), which includes a plurality of host processors that are configured to access pages having a predetermined page size in the physical memory, the product comprising a computer-readable medium in which program instructions are stored, which instructions, when read by the host processors, cause the processors to select one of the pages of the physical memory in which to store a plurality of data items, including at least first and second data items, to divide the selected page of the physical memory into a plurality of minipages, including at least first and second minipages containing the first and second data items, respectively, to map both first and second virtual pages, in a virtual memory space of the processors, to the selected page of the physical memory, such that the first and second virtual pages are associated respectively with the first and second minipages, and the first data item receives a first address on the first virtual page, while the second data item receives a second address on the second virtual page, and to apply first and second access permissions to the first and second virtual pages, respectively, wherein when the processors receive requests by a process running on one of the host processors to access the first and second data items via the respective first and second addresses on the first and second virtual pages, the instructions cause the processors to permit the process, responsive to the requests, to access the first data item subject to the first access permission and the second data item subject to the second access permission.

38. A computer software product, for controlling access to a physical memory in a distributed shared memory system (DSM), which includes a plurality of host processors that are configured to access pages having a predetermined page size in the physical memory, the product comprising a computer-readable medium in which program instructions are stored, which instructions, when read by the host processors, cause the processors to select a sequence of the pages of the physical memory in which to store a plurality of data items, to divide each of the pages of the physical memory in the sequence into a plurality of minipages, including at least first and second minipages, to store a respective first one of the data items in each of the first minipages, and a respective second one of the data items in each of the second minipages, whereby the data items stored in the first minipages constitute a first group, and the data items stored in the second minipages constitute a second group, to map respective first and second virtual pages, in a virtual memory space of the processors, to each of the pages of the physical memory in the sequence, such that the first and second virtual pages are associated respectively with the first and second minipages on each of the pages in the physical memory, and the first data item on each of the pages of the physical memory receives a first address on the respective first virtual page, while the second data item on each of the pages of the physical memory receives a second address on the respective second virtual pages, and to apply respective access permissions to the virtual pages, wherein when the processors receive a request by a process running on one of the host processors to access the data items in a selected one of the first and second groups over a sequential range of the pages of the physical memory via the respective addresses on the virtual pages that are associated with the minipages of the selected group, the instructions cause the processors to permit the process, responsive to the requests, to access the data items over the sequential range subject to the access permissions applied to the virtual pages.

* * * * *